(12) United States Patent
Hoff (10) Patent No.: US 8,738,250 B2
(45) Date of Patent: May 27, 2014

(54) POWER SOURCE SPEED CONTROL IN A MACHINE WITH A CVT

(75) Inventor: Brian D. Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 654 days.

(21) Appl. No.: 12/956,760

(22) Filed: Nov. 30, 2010

(65) Prior Publication Data

US 2012/0136548 A1 May 31, 2012

(51) Int. Cl.
*G06F 7/00* (2006.01)
*G06F 17/00* (2006.01)
*G06F 19/00* (2011.01)

(52) U.S. Cl.
USPC .......... 701/54; 701/51; 701/55; 701/56; 701/60

(58) Field of Classification Search
None
See application file for complete search history.

(56) References Cited

U.S. PATENT DOCUMENTS

| | | | |
|---|---|---|---|
| 4,493,228 A | 1/1985 | Vukovich et al. | |
| 5,012,419 A * | 4/1991 | Yamamoto | 701/95 |
| 5,140,871 A * | 8/1992 | Goto et al. | 477/131 |
| 5,277,269 A | 1/1994 | Ichimura et al. | |
| 5,682,315 A | 10/1997 | Coutant et al. | |
| 5,758,306 A * | 5/1998 | Nakamura | 701/93 |
| 5,871,417 A * | 2/1999 | Suzuki | 477/43 |
| 6,066,070 A | 5/2000 | Ito et al. | |
| 6,070,118 A * | 5/2000 | Ohta et al. | 701/65 |
| 6,311,118 B1 | 10/2001 | Ito et al. | |
| 6,553,302 B2 | 4/2003 | Goodnight et al. | |
| 6,898,507 B2 * | 5/2005 | Aoyama et al. | 701/93 |
| 7,195,580 B2 | 3/2007 | Funato et al. | |
| 7,234,556 B2 | 6/2007 | Pendleton | |
| 7,319,927 B1 * | 1/2008 | Sun et al. | 701/93 |
| 7,641,588 B2 | 1/2010 | Thomson et al. | |
| 7,678,005 B2 | 3/2010 | Tuckfield | |
| 7,685,900 B2 | 3/2010 | Fukasawa et al. | |
| 8,214,123 B2 * | 7/2012 | Inoue et al. | 701/93 |
| 2007/0255477 A1 * | 11/2007 | Okuda et al. | 701/93 |
| 2008/0228334 A1 * | 9/2008 | Hashimoto | 701/22 |
| 2008/0228362 A1 * | 9/2008 | Muller et al. | 701/54 |
| 2009/0143192 A1 * | 6/2009 | Fuchs et al. | 477/43 |
| 2010/0106382 A1 * | 4/2010 | Kodaka et al. | 701/54 |
| 2010/0261576 A1 * | 10/2010 | Ishido et al. | 477/43 |
| 2010/0262352 A1 * | 10/2010 | Kuwahara et al. | 701/102 |

FOREIGN PATENT DOCUMENTS

| | | |
|---|---|---|
| DE | 195 06 082 A1 | 8/1996 |
| WO | WO 2010/082896 A1 | 7/2010 |

* cited by examiner

*Primary Examiner* — Bao Long T. Nguyen
(74) *Attorney, Agent, or Firm* — Finnegan, Henderson, Farabow, Garrett & Dunner LLP (57) ABSTRACT

Methods and systems for controlling a power source of a mobile machine having a continuously variable transmission (CVT) are disclosed. In one embodiment, the method includes receiving, from an operator of the mobile machine, input selecting of one of a plurality of target travel speeds of the mobile machine and input indicative of a requested output speed of the power source. The method further includes calculating a difference between the selected target travel speed and an actual travel speed of the mobile machine. Finally, the method includes adjusting the requested output speed of the power source based on the calculated travel speed difference, and commanding the power source based on the adjusted requested output speed of the power source.

24 Claims, 8 Drawing Sheets

| 58 | 60 — VIRTUAL GEAR MAP | 61 |
|---|---|---|
| VIRTUAL GEAR | TARGET TRAVEL SPEED (kph) | PEDAL SCALING |
| 1 | 8.0 | NO |
| 1.25 | 9.75 | NO |
| 1.5 | 11.5 | NO |
| 1.75 | 13.25 | NO |
| 2.0 | 15.0 | NO |
| 2.25 | 17.5 | NO |
| 2.5 | 20.0 | YES |
| 2.75 | 22.5 | YES |
| 3.0 | 25.0 | YES |
| 3.25 | 27.5 | YES |
| 3.5 | 30.0 | YES |
| 3.75 | 32.5 | YES |
| 4 | 35 | YES |

POWER SOURCE SPEED CONTROL IN A MACHINE WITH A CVT

TECHNICAL FIELD

This disclosure is directed to a mobile machine having a continuously variable transmission (CVT) system. More particularly, this disclosure relates to methods and systems for controlling the speed of a power source of a mobile machine having a CVT.

BACKGROUND

Mobile machines such as, for example, wheel loaders, dozers, backhoes, haul trucks, tractors and other heavy equipment are used to perform a variety of tasks. To effectively perform the tasks, the machines require a power source, such as an engine, that provides sufficient torque through a transmission to one or more ground-engaging devices. Typically, such machines have a manual transmission with a discrete number of step-changed output ratios or gears to control the speed and torque of the ground-engaging devices.

The gears correspond to respective known travel speeds of the machines. For example, when the operator of a wheel loader fully depresses the accelerator pedal in second gear, the wheel loader accelerates to a maximum travel speed of about 18 kph. Consequently, machine operators have become accustomed to using certain gears for accomplishing certain tasks. For instance, from experience, the operator of a wheel loader may know that the speed of second gear is appropriate for effectively leveling a mound of earth of a given size. Similarly, the operator may know that the speed of third gear is appropriate for carrying a load across a worksite safely and without significant spillage.

More recently, however, conventional step-changed transmissions are being replaced with continuously variable transmissions (CVT) on such mobile machines. A CVT provides an infinite number of torque-to-speed output ratios within its overall range. Although a CVT improves engine efficiency, it does not behave in the manner discussed above with respect to step-changed transmissions and travel speed. For example, fully depressing the accelerator pedal in a mobile machine with a CVT will cause the machine to accelerate to a maximum possible speed, as the engine output and CVT output increase respectively to a maximum possible speed. Therefore, in a machine with a CVT, the operator must hold the accelerator pedal at an intermediate position in order to travel at a desired speed less than the maximum. As can be appreciated, however, this may prove difficult in rough terrain common to many worksites, leading to undue operator fatigue.

One method of controlling the travel speed of a machine having a CVT is disclosed by U.S. Pat. No. 7,641,588 to Thomson et al. ("the '588 patent"). The '588 patent describes a CVT system that provides multiple "virtual gears" corresponding to different travel speed ranges of the machine. Specifically, the operator of the machine may select a desired "virtual gear" based on the task the operator is to perform. Thereafter, a controller associated with the system controls the output of the power source and/or the output of the CVT such that the travel speed of the machine remains within a speed range corresponding to the selected virtual gear. For example, if the operator selects virtual second gear, the controller may control the power source and/or the CVT such that the machine travels within a speed range corresponding to second gear in a machine having a manual transmission operating in second gear (e.g., less than 18 kph). In this manner, the CVT system of the '588 patent enables the operator to control the mobile machine to behave in a familiar manner, at least with respect to travel speed, resulting in greater operator confidence and comfort in accomplishing the task.

Although the system of the '588 patent may address problems associated with maintaining a desired travel speed in a machine having a CVT, it may nonetheless have some drawbacks. For example, while the system may control the power source and/or the CVT such that the machine travels at a speed within the range of the selected virtual gear, the system may not operate the power source and/or the CVT in an economical manner in certain situations.

The present disclosure addresses one or more of the problems set forth above, as well as other problems in the art.

SUMMARY OF THE INVENTION

One aspect of the present disclosure relates to a method for controlling a power source of a mobile machine having a continuously variable transmission (CVT). The method may include receiving a selection of one of a plurality of target travel speeds of the mobile machine, receiving input indicative of a requested output speed of the power source, and calculating a difference between the selected target travel speed and an actual travel speed of the mobile machine. The method may further include adjusting the requested output speed of the power source based on the calculated travel speed difference. Finally, the method may include commanding the power source based on the adjusted requested output speed of the power source.

Another aspect of the present disclosure is directed to a control system for controlling a power source of a mobile machine having a continuously variable transmission (CVT). The system may include a memory storing a plurality of target travel speeds of the mobile machine, a first operator input device configured to receive from an operator of the mobile machine input selecting one of the plurality target travel speeds, and a second operator input device configured to receive from the operator input indicative of a requested output speed of the power source. The system may further include a sensor configured to sense an actual travel speed of the mobile machine. The system may also include a controller. The controller may calculate a difference between the selected target travel speed of the mobile machine and the actual travel speed of the mobile machine, and may adjust the requested output speed of the power source based on the calculated travel speed difference. Finally, the controller may command the power source based on the adjusted requested output speed.

Yet another aspect of the disclosure relates to a mobile machine. The mobile machine may have at least one traction device configured to propel the mobile machine, a power source configured to generate a power output, and a continuously variable transmission (CVT) configured to drive the at least one traction device with the power output. The mobile machine may also have a memory storing a plurality of target travel speeds of the mobile machine, a first operator input device configured to receive from an operator of the mobile machine input selecting one of the plurality target travel speeds, and a second operator input device configured to receive from the operator input indicative of a requested output speed of the power source. The mobile machine may further include a sensor configured to sense an actual travel speed of the mobile machine. The mobile machine may also include a controller. The controller may calculate a difference between the selected target travel speed of the mobile machine and the actual travel speed of the mobile machine, and may adjust the requested output speed of the power source based on the calculated travel speed difference. Finally, the controller may command the power source based on the adjusted requested output speed.

Still yet another aspect of the disclosure relates to another method for controlling a power source of a mobile machine having a continuously variable transmission (CVT). The method may include receiving, from an operator of the mobile machine, input indicative of a requested output speed of the power source, and commanding the power source based on the requested output speed of the power source. The method may further include determining whether the power source and the CVT have maintained state-state output for a period of time. When it is determined that the power source and the CVT have maintained state-state output for a period of time, the method may override the requested output speed of the power source with a reduced requested power source output speed of the power source, and may command the power source based on the reduced requested output speed of the power source.

DETAILED DESCRIPTION

Figure 1:
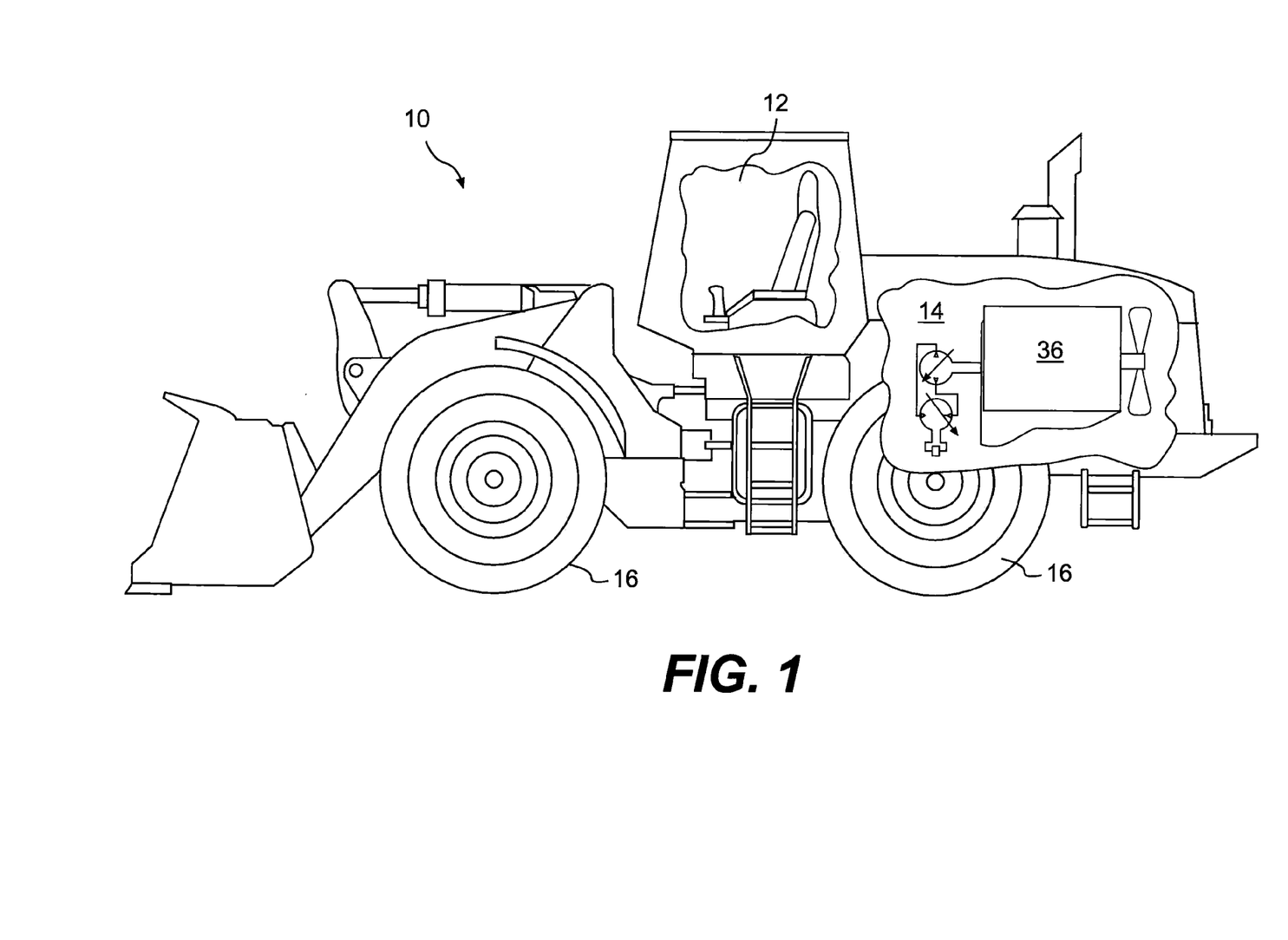
FIG. 1 is a representation of an exemplary mobile machine.

FIG. 1 illustrates an exemplary mobile machine 10 having multiple systems and components that cooperate to accomplish a task. The tasks performed by machine 10 may be associated with a particular industry, such as mining, construction, farming, transportation, or any other industry in which mobile machines are used. For example, machine 10 may embody a wheel loader as depicted in FIG. 1, an on- or off-highway haul truck, a passenger vehicle, or any other type of mobile machine. Machine 10 may include an operator station 12, from which operator control of machine 10 may be affected. Machine 10 may also include a CVT-based power train 14 operatively coupled to provide motive power to one or more traction devices 16, such as, for example, wheels, tracks, or belts.

Figure 2:
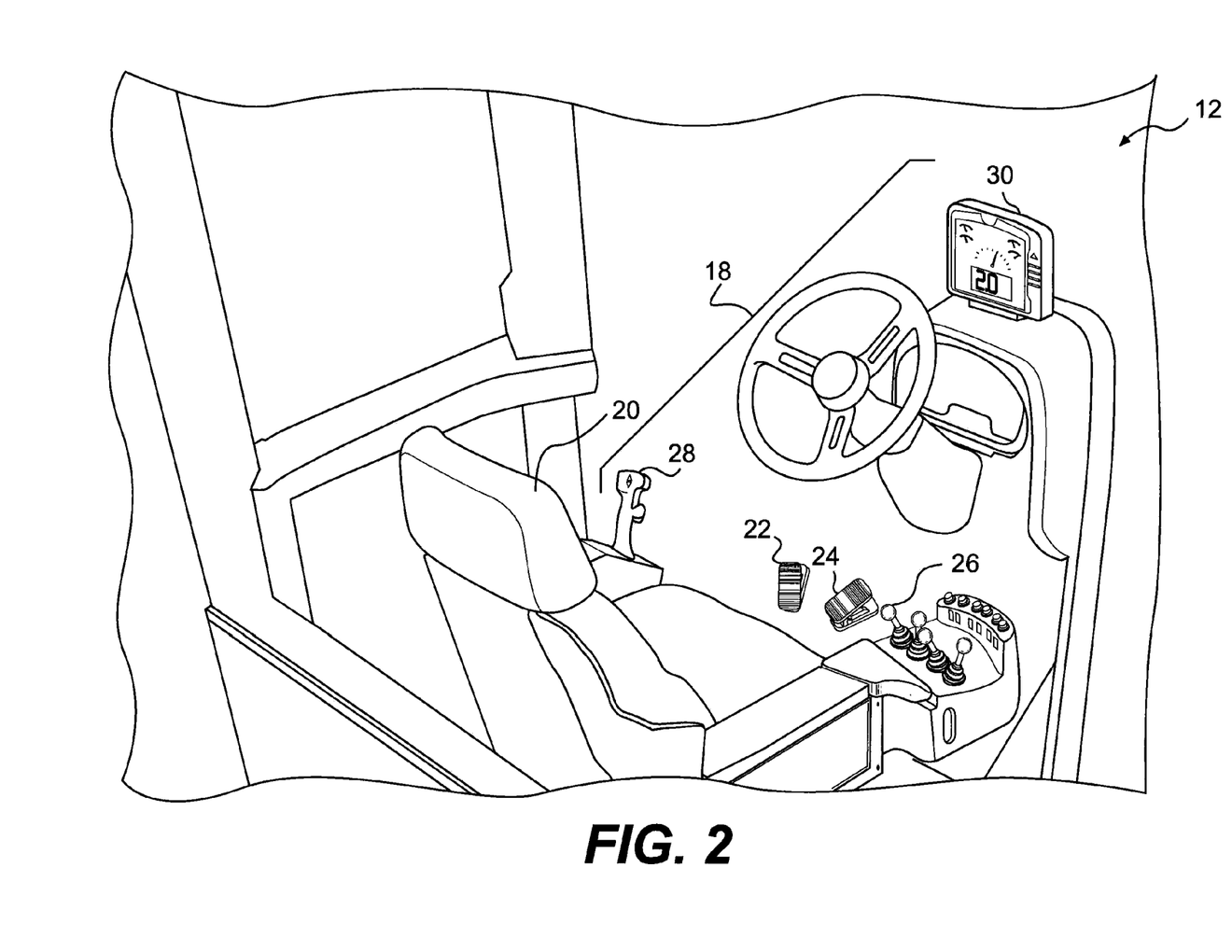
FIG. 2 is a representation of an exemplary disclosed operator station of the mobile machine.

As illustrated in FIG. 2, operator station 12 may include devices that receive input from a machine operator indicative of desired machine travel, maneuvering, and/or control. For example, operator station 12 may include an operator interface 18 located proximate an operator seat 20. Input to operator interface 18 may initiate movement of machine 10 by producing signals that are indicative of desired machine travel, maneuvers, and/or control. In one embodiment, operator interface 18 may include a left foot pedal 22, a right foot pedal 24, a forward-neutral-reverse (FNR) selector 26, a virtual gear selector 28, and a display device 30.

As the operator manipulates left foot pedal 22 by displacing left foot pedal 22 away from its neutral position, the operator may expect and affect a corresponding retardation in the propulsion or travel of machine 10. As the operator manipulates right foot pedal 24, on the other hand, the operator may expect and affect a corresponding increase in the propulsion or travel of machine 10.

FNR selector 26 may allow the operator to selectively place CVT power train 14 in a forward travel mode, a neutral mode, and a reverse travel mode. For example, as shown in FIG. 2, FNR selector 26 may be a lever movable through three positions corresponding to forward travel mode, neutral mode, and reverse travel mode.

Virtual gear selector 28 may be manipulated by the operator to select a desired "virtual gear" from among multiple available virtual gears for machine travel. For example, as shown in FIG. 2, virtual gear selector 28 may embody a lever or joystick allowing the operator to shift or toggle through the available virtual gears.

In one embodiment, several virtual gears may be provided, such as virtual gears 1 through 4. Moreover, incremental virtual gears may be provided, such for each half, quarter, or tenth of a gear (e.g., virtual gears 1.1, 2.5, or 3.75). As discussed in more detail below, each virtual gear may correspond to a particular "target" travel speed of mobile machine 10. In one embodiment, the target travel speed may be a preset maximum travel speed associated with the virtual gear. Once a virtual gear has been selected, CVT power train 14 may subsequently be controlled such that machine 10 travels within a speed range less than the target travel speed associated with the selected virtual gear.

Left foot pedal 22, right foot pedal 24, FNR selector 26, and virtual gear selector 28 are shown in the FIG. 2 as embodied as pedals, levers, or joysticks. It is to be appreciated, however, that these devices may alternatively or additionally comprise buttons, switches, knobs, wheels, keypads, touchpads, control panels, and/or any other devices known in the art for receiving input from the operator of machine 10.

Figure 3:
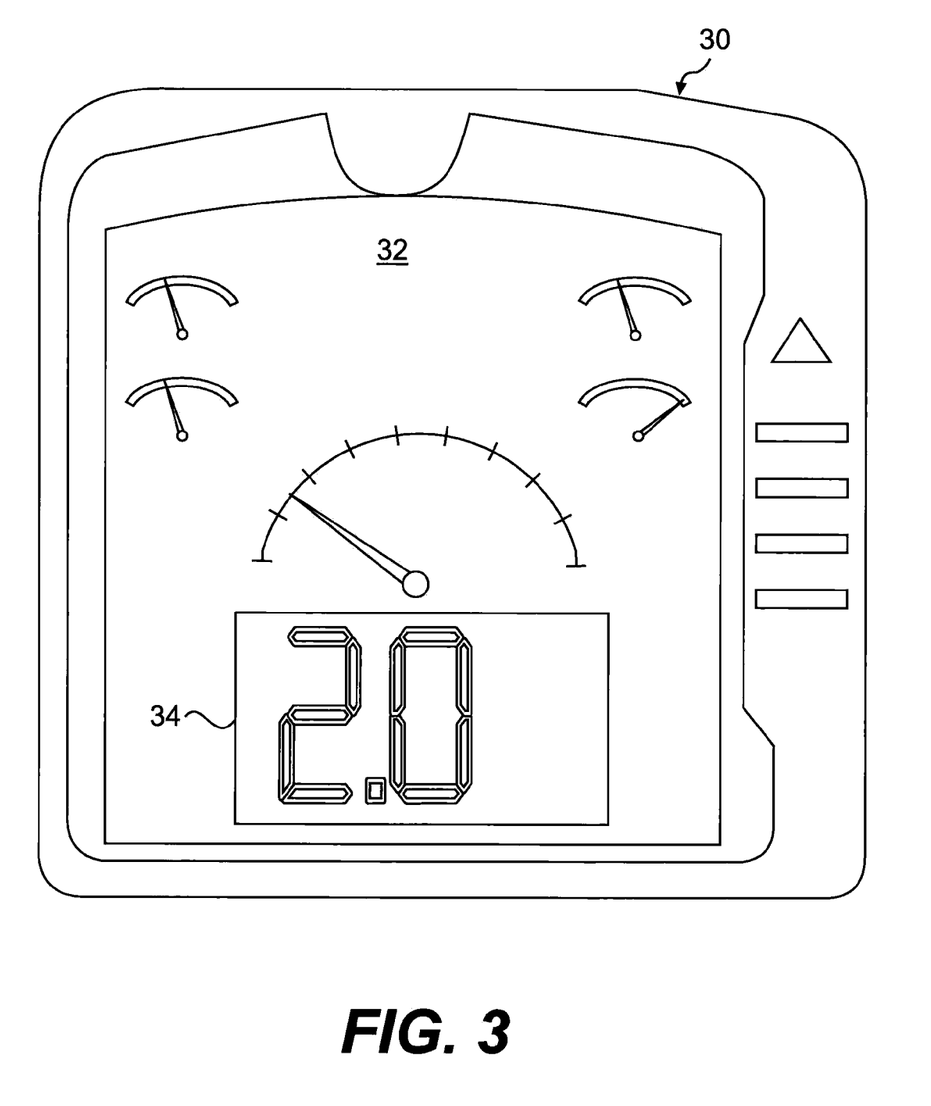
FIG. 3 is a representation of an exemplary display device associated with the mobile machine.

Display device 30 may be configured to display to the operator information relating to the operation of machine 10. As shown in FIG. 3, display device 30 may display a virtual instrument panel 32 including, among other information, a readout 34 of the selected virtual gear. In one embodiment, display device 30 may comprise a machine-mounted display computer, a monitor, a touch-screen, a portable computing device, a smart phone, a laptop computer, a tablet PC, or any other type of computer display known in the art. In certain embodiments, display device 30 may be configured to receive input from the operator, such as by way of a touch-screen, software keys, bezel keys, physical buttons, a keypad, and/or other input means.

Figure 4:
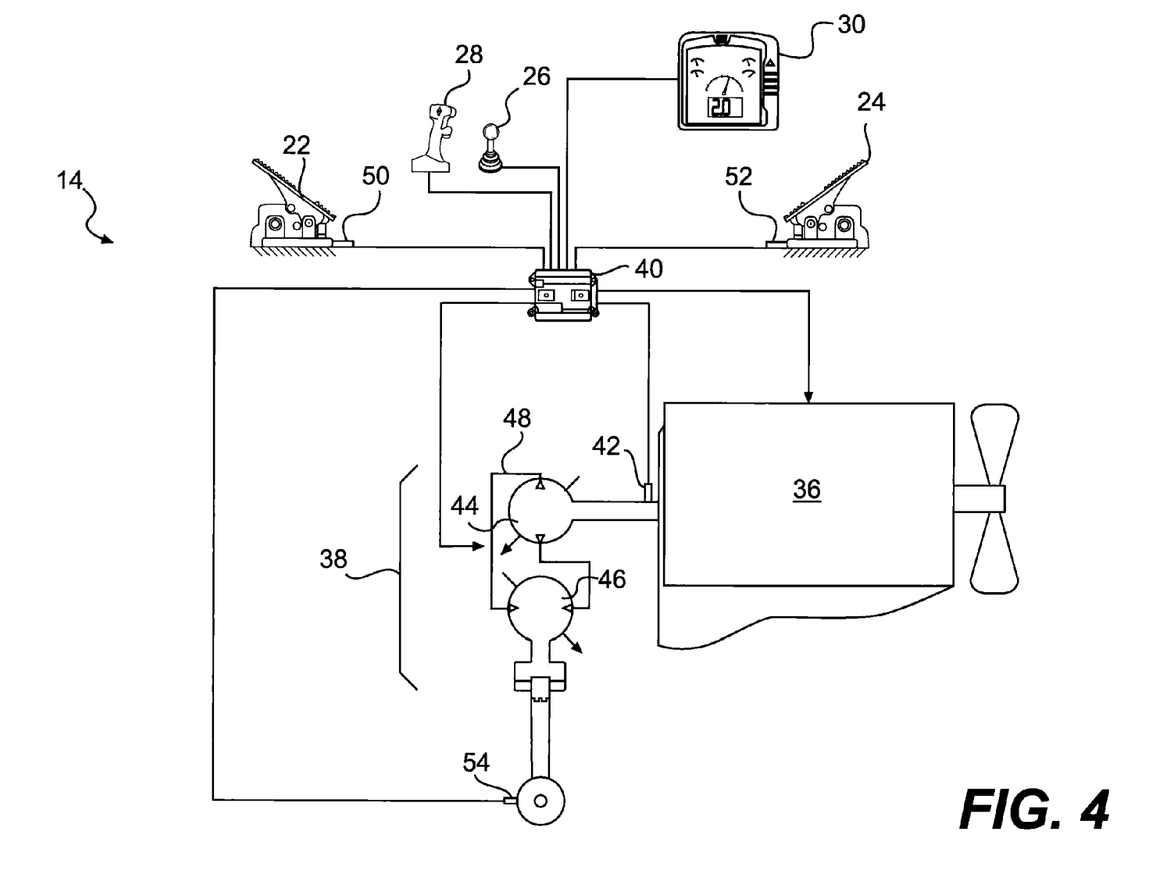
FIG. 4 is a representation of an exemplary power train associated with the mobile machine.

As illustrated in FIG. 4, power train 14 may be an integral package that generates and transmits power to traction devices 16. In particular, power train 14 may include a power source 36 operable to generate a power output, a CVT 38 connected to receive the power output of the power source and transmit the power output in a useful manner to traction devices 16. Power train 14 may also include a controller 40 configured to regulate the operation of CVT 38 and/or power source 36 in response to one or more inputs and/or operational information associated with mobile machine 10.

Power source 36 may comprise an internal combustion engine having multiple subsystems that cooperate to produce mechanical or electrical power output. In one embodiment, power source 36 may be a four-stroke diesel engine. It is to be appreciated, however, that power source 36 may be any other type of internal combustion engine known in the art, such as, for example, a gasoline or a gaseous fuel-powered engine. Subsystems included within power source 36 may include, for example, a fuel system, an air induction system, an exhaust system, a lubrication system, a cooling system, or any other appropriate system.

A power source speed sensor 42 may be associated with power source 36 and configured to sense an output speed thereof. For example, sensor 42 may embody a magnetic pickup-type sensor in communication with a magnet embedded within a rotational component of power train 14, such as a crankshaft or flywheel (e.g., at the input of CVT 38). During operation of power source 36, sensor 42 may detect a rotating magnetic field produced by the embedded magnet and generate a signal corresponding to the rotational speed of power source 36. In other embodiments, rather than a physical sensor, sensor 42 may embody a virtual sensor, such as a software module executed by controller 40, configured to determine a rotational speed of power source 36 based on one or more measured input parameters of mobile machine 10.

CVT 38 may be any type of continuously variable transmission such as, for example, a hydraulic CVT, a hydro-mechanical CVT, an electric CVT, or other configuration as would be apparent to one skilled in the art. In some embodiments, CVT 38 may include a conventional automatic or manual transmission coupled in parallel with a CVT through one or more gear assemblies—such as a a combination of a carrier gear, a ring gear, and a sun gear—to drive traction devices 16. In one embodiment, shown in FIG. 4, CVT 38 may include a driving element 44 and a driven element 46.

Driving element 44 may receive the output of power source 36. Driving element 44 may couple the power output to driven element 46 which, in turn, may drive traction devices 16 and propel machine 10. One or more operational characteristics of driving element 44 and/or driven element 46 may be controlled in response to an output torque request of controller 40 to affect a continuously variable torque-to-speed ratio.

In an exemplary electric CVT configuration, driving element 44 may be a generator, such as a three-phase permanent magnet alternating field-type generator or other type of generator known in the art. Driven element 46, on the other hand, may be an electric motor, such as permanent magnet alternating field-type motor or other type of motor known in the art. The generator may be coupled to receive the mechanical power output of power source 36, and to generate a corresponding electrical power output. The generator may drive the motor with the electrical power output through power electronics 48. Power electronics 48 may vary the electrical power supplied to the motor, in response an output torque command of controller 40, to provide a continuously variable torque-to-speed ratio. In some situations, the motor may also drive the generator in a reverse direction through power electronics 48.

Power electronics 48 may include generator associated components and motor associated components. For example, power electronics 48 may include one or more drive inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating driving element 44 and driven element 46. Other components that may be associated with the drive inverter include power supply circuitry, signal conditioning circuitry, and solenoid driver circuitry, among others. In addition, power electronics 48 may include a generator heat sink (not shown), and a motor heat sink (not shown) in communication with driving and driven elements 44, 46, respectively. Each heat sink may absorb heat from its respective component of power electronics 48 and transfer this heat to a cooling system (not shown).

In an exemplary mechanical CVT configuration, driving element 44 and driven element 46 may comprise driving and driven frictional elements, respectively. The driving frictional element may transfer the mechanical power output of power source 36 to the driven frictional element through frictional contact surfaces of the driving frictional element and the driven frictional element. In addition, power electronics 48 may vary the diameter of the contact surface of one or both of the driving frictional element and the driven frictional element, in response to an output torque command received from controller 40, to affect a continuously variable torque-to-speed ratio.

In a hydraulic CVT configuration, driving element 44 and driven element 46 may comprise a hydraulic pump and motor, respectively. The pump may transfer the mechanical power output of power source 36 to the motor through a fluid passageway. Power electronics 48 may vary the displacement of the pump, the motor, or both the pump and motor, in response to an output torque command received from controller 40, to affect a continuously variable torque-to-speed ratio.

CVT 38 may be at least partially controlled with left and right foot pedals 22 and 24. In one embodiment, as right foot pedal 24 is manipulated by the operator, right foot pedal 24 may provide a displacement signal indicative of desired machine travel. Specifically, the displacement signal may indicate a commanded output speed of power source 36 and/or a commanded output torque of CVT 38. On the other hand, as left foot pedal 22 is manipulated by the operator, left foot pedal 22 may provide a displacement signal indicative of a desired retarding of machine travel or neutralization of the given right pedal command.

For example, left and right foot pedals 22 and 24 may be displaceable from a minimum displacement position through a maximum displacement position. Sensors 50 and 52 may be provided in association with left and right foot pedals 22 and 24, respectively, to sense the displacement positions thereof and produce corresponding displacement signals based on the displaced positions of pedals 22 and 24. Sensors 50 and 52 may be any type of sensor capable of sensing the displacement of foot pedals 22 and 24 such as, for example, a switch or potentiometer. The displacement signals of sensors 50 and 52 may be provided to controller 40 to control power source 36 and/or CVT 38. In one embodiment, the displacement signal associated with left foot pedal 22 combined with the displacement signal associated with right foot pedal 24 may represent a "net" displacement signal corresponding to overall machine travel desired by the operator.

Continuing with FIG. 4, a travel speed sensor 54 may be associated with CVT 38 and/or traction devices 16 (FIG. 1) to sense a travel speed of machine 10. In one example, sensor 54 may embody a magnetic pickup type-sensor in communication with a magnet embedded within a rotational component of power train 14, such as a drive shaft. During operation of machine 10, sensor 54 may detect the rotating magnetic field produced by the magnet and generate a signal corresponding to the rotational speed of CVT 38 (e.g., driven element 46) and/or to the travel speed of machine 10. In other embodiments, rather than a physical sensor, sensor 54 may embody a virtual sensor, such as a software module executed by controller 40, configured to determine an expected travel speed of mobile machine 10 based on one or more measured operational parameters of mobile machine 10.

Controller 40 may embody a single microprocessor or multiple microprocessors for controlling the operation of power train 14 in response to the received signals. Numerous commercially-available microprocessors can be configured to perform the functions of controller 40. It should be appreciated that controller 40 could readily embody a general machine microprocessor capable of controlling numerous machine functions. Controller 40 may include a memory, a secondary data storage device, a computer processor, and/or any other components for running an application or program logic. Various other circuits may be associated with controller 40, such as power supply circuitry, signal conditioning circuitry, amplification circuitry, solenoid driver circuitry, and/or other types of circuitry. In one embodiment, controller 40 may include an electronic control module (ECM), such as an engine and/or transmission control module, configured to perform the disclosed processes.

Figure 5:
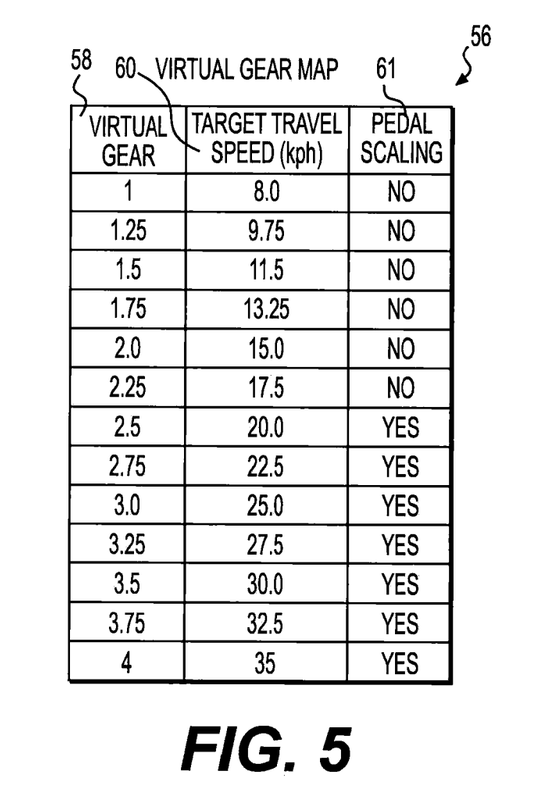
FIG. 5 is a representation of an exemplary virtual gear map associated with a controller of the mobile machine.

Controller 40 may include one or more maps stored in the memory associated with controller 40. Each map may include a collection of data in the form of, for example, lookup tables, graphs, and/or equations. As shown in FIG. 5, in one embodiment, controller 40 may include at least one virtual gear map 56. Virtual gear map 56 may store information mapping one or more operator-selectable virtual gears 58 to corresponding target travel speeds 60 of machine 10. In one embodiment, the target travel speeds 60 of virtual gears 58 may correspond to maximum or target travel speeds of a similar machine 10 having a manual step-changed transmission when operating in corresponding gears. For example, in the non-limiting example of virtual gear map 56 shown in FIG. 5, the target machine travel speed in virtual gear 1 is 8.0 kph, and the target machine travel speed associated with virtual gear 3.25 is 27.5 kph.

In addition, virtual gear map 56 may further include a pedal scaling indicator 61 for each virtual gear 58 indicating whether the displacement signal of right foot pedal 24 is to be scaled when machine 10 is operating in that virtual gear. In some situations, the operator of machine 10 may wish to travel at a certain speed. Thus, the operator may use virtual gear selector 28 to select a desired virtual gear 58 having an appropriate target travel speed 60, and fully displace right foot pedal 24. In response to the maximum displacement signal generated by sensor 52, power source 36 may be commanded to a maximum output speed (i.e., rotational speed) and CVT 38 may be commanded to a maximum output torque, causing machine 10 achieve the target travel speed 60 of the virtual gear.

Consistent with the disclosed embodiments, it may be desirable to modify or scale the displacement signal of right foot pedal 24 to reduce the output speed of power source 36 and operate machine 10 in a more economical manner. For instance, as machine 10 approaches the target travel speed (i.e., run-out) in a virtual gear typically used for travel, such as virtual gear 4, a lower output speed of power source 36 may be required to accelerate machine 10 to the target travel speed in an acceptable manner. In addition, once the target travel speed is attained, less power output may be required to maintain machine 10 at that speed. Since the operator has fully displaced right foot pedal 24, however, power source 36 is commanded to the maximum output speed, which may be in excess of that necessary to accelerate machine 10 to and/or maintain the target speed. Accordingly, as shown in FIG. 5, pedal scaling indicators 61 associated with high virtual gears 58, such as virtual gears and virtual gear increments above virtual gear 2.5, may indicate that controller 40 should scale the displacement signal of right foot pedal 24 to reduce the output speed of power source 36 when the travel speed of machine 10 approaches the target travel speeds 60 associated with these virtual gears.

On the other hand, it may not be desirable to reduce the output speed of power source 36 in circumstances where a high output speed of power source 36 is advantageous or necessary, such as when the operator is operating machine 10 in a low virtual gear typically used for work tasks, such as dozing, scraping, or hauling. Accordingly, in one embodiment shown in FIG. 5, pedal scaling indicators 61 associated with low virtual gears 58, such as virtual gears and increments below virtual gear 2.5, may indicate that controller 40 should not scale the displacement signal of right foot pedal 24 to reduce the output speed of power source 36 when the travel speed of machine 10 approaches the target travel speeds 60 associated with these virtual gears.

Although virtual gear map 56 only shows virtual gears 58 for increments of a quarter gear between virtual gears 1 and 4, it is to be appreciated that any number and/or increments of virtual gears, as well as any target travel speeds 60 associated with the gears, are within the scope of the disclosure. In addition, it is contemplated that pedal scaling indicators 61 may be set such that the operator's right pedal command is scaled in additional and/or different virtual gears 58 than those shown in FIG. 5. In other words, the virtual gear map 56 of FIG. 5 is intended as illustrative rather than limiting.

Figure 6:
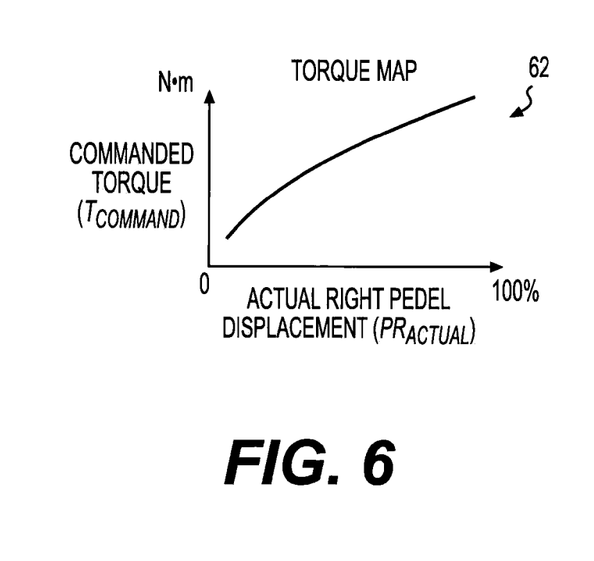
FIG. 6 is a representation of an exemplary torque map associated with the controller.

FIG. 6 illustrates an exemplary torque map 62 stored in the memory associated with controller 40. As shown, torque map 62 may map an amount of actual displacement $PR_{Actual}$ of right pedal 24 to a corresponding commanded or requested torque output $T_{Command}$ of CVT 38. It is to be appreciated that, in general, the more the operator displaces right foot pedal 24, the greater the torque output the operator desires of CVT 38. Accordingly, in one embodiment, torque map 62 may have a generally positive slope, and may map actual right pedal displacement values $PR_{Actual}$ of 0% through 100% to corresponding increasing amounts of commanded torque output $T_{Command}$ of CVT 38.

Figure 7:
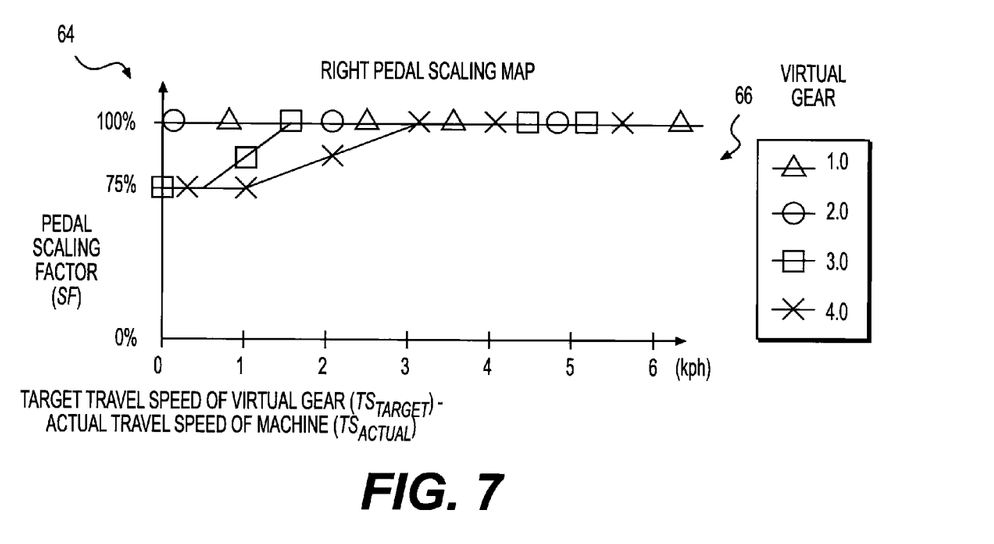
FIG. 7 is a representation of an exemplary pedal scaling map associated with the controller.

FIG. 7 illustrates an exemplary right pedal scaling map 64 stored in the memory associated with controller 40. As shown, right pedal scaling map 64 may include one or more curves 66. Curves 66 may map a difference between the actual travel speed $TS_{Actual}$ of machine 10, and the target travel speeds 60 ($TS_{Target}$) of machine 10 for the virtual gears 58, to corresponding pedal scaling factors SF between 0% and 100%. As discussed in detail below, controller 40 may use the pedal scaling factor SF determined from right pedal scaling map 64 to override or modify the operator's right pedal command and reduce the output speed of power source 36 as the travel speed of machine 10 approaches the target travel speed $TS_{Target}$ for the selected virtual gear. Accordingly, power source 36 may be operated at an economical speed while still maintaining, or accelerating to, the desired target travel speed $TS_{Target}$ for the selected virtual gear.

In one embodiment shown in FIG. 7, right pedal scaling map 64 may include a curve 66 for each virtual gear 58. For sake of brevity, only curves for virtual gears 1 through 4 are shown. It is contemplated, however, that curves 66 for any number and/or combination of virtual gears 58 and/or virtual gear increments may be included in right pedal scaling map 64. In certain configurations, curves 66 for low virtual gears, such as virtual gears and virtual gear increments between 1 and 2.5, may specify a right pedal scaling factor SF of 100% throughout the entire range of differences between the actual travel speed $TS_{Actual}$ of machine 100 and the target travel speed $TS_{Target}$ of machine 10 associated with the virtual gear.

This is because, in low virtual gears, the operator may generally be performing tasks that demand or benefit from a greater output speed of power source 36, such as dozing, grading, or hauling tasks. In addition, during the course of performing such tasks, sudden increases in the output speed demanded of power source 36 may occur. Accordingly, in one embodiment, curves 66 associated with low virtual gears may be configured such that controller 40 may not override or modify the operator's right pedal command (i.e., may specify a scaling factor SF at or about 100%)—even when approaching or traveling at the target travel speed $TS_{Target}$ for the virtual gear—to ensure that a high power output is available when necessary.

On the other hand, curves 66 for high virtual gears, such as virtual gears and virtual gear increments between 2.5 and 4.0, may specify different right pedal scaling factors SF depending upon the difference between the actual travel speed $TS_{Actual}$ of machine 10 and the target travel speed $TS_{Target}$ for the virtual gear. In one configuration, the right pedal scaling factor SF specified by curves 66 may decrease as the difference between the actual travel speed $TS_{Actual}$ of machine 10 approaches the target travel speed $TS_{Target}$ of the virtual gear. For example, as shown in FIG. 7, the curve 66 for virtual gear 3.0 specifies that the pedal scaling factor SF begins decreasing from 100% to 75% after the actual travel speed $TS_{Actual}$ of machine 10 reaches 2 kph. Similarly, the curve 66 for virtual gear 4.0 specifies that the pedal scaling factor SF begins decreasing from 100% to 75% after the actual travel speed $TS_{Actual}$ of machine 10 reaches 3 kph. This is because, in high virtual gears, as the actual travel speed $TS_{Actual}$ of machine 10 approaches the target travel speed $TS_{Target}$ of the virtual gear, less acceleration and, thus, a lower output speed of power source 36, may be required to accelerate machine 10 to and maintain the target travel speed $TS_{Target}$. Moreover, when using a high virtual gear, machine 10 is generally traveling at a constant or nearly constant high speed, which may require a substantially steady and low output speed of power source 36 in comparison to operation in a low virtual gear. Accordingly, in a high virtual gear, as machine 10 approaches run-out, there is an opportunity to override or modify the operator's right pedal command to economically reduce the output speed of power source 36 without sacrificing desired machine performance. In other words, curves 66 for high virtual gears may provide for a gradual "roll-off" of power source output speed as the actual travel speed $TS_{Actual}$ of machine 10 approaches the target travel speeds $TS_{Target}$ 60 of the virtual gears.

Although the exemplary curves 66 of map 64 may be described or shown as mapping certain differences between the actual travel speed $TS_{Actual}$ of machine 10 and the target travel speeds $TS_{Target}$ 60 of virtual gears 58 to certain pedal scaling factors SF, these examples are intended to be illustrative rather than limiting. Indeed, the shapes, scale factors SF, and/or speeds associated with curves 66 may vary depending upon the configuration, type, desired performance, and/or intended operational environment of machine 10, and fall within the scope of the disclosure.

Figure 8:
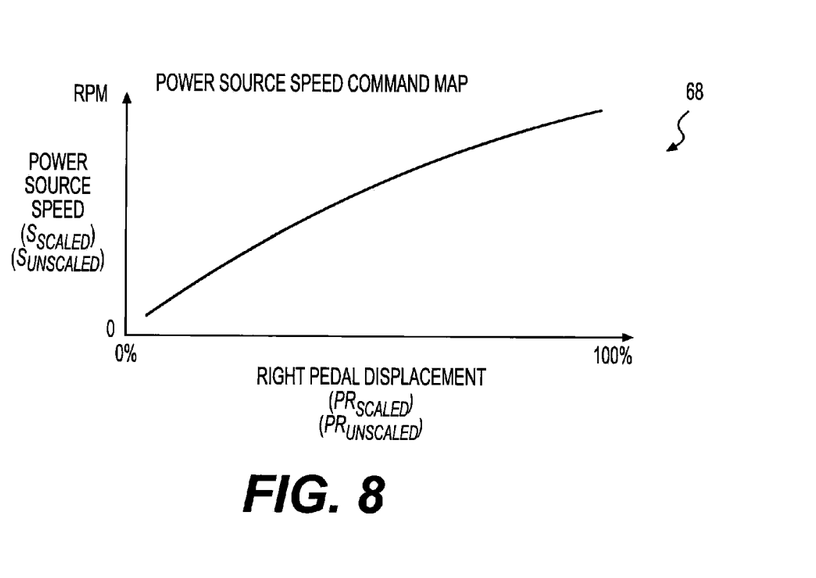
FIG. 8 is a representation of an exemplary power source speed command map associated with the controller.

FIG. 8 illustrates an exemplary power source speed command map 68 stored in the memory associated with controller 40. As shown, power source speed command map 68 may map a scaled amount of displacement $PR_{scaled}$ of right pedal 24, scaled using a scale factor SF determined from right pedal scaling map 64, to a corresponding scaled commanded or requested output speed $S_{scaled}$ of power source 36. In one embodiment, the amount of displacement of right foot pedal 24 may be determined as follows:

$$PR_{Scaled} = PR_{Actual} \times SF \quad (1)$$

where $PR_{Actual}$ is a value between 0 and 100% representing the actual displacement of right pedal 24, as indicated by a signal from sensor 52; SF is a pedal scaling factor between 0 and 100% determined from right pedal scaling map 64; and $PR_{scaled}$ is a scaled displacement value of right foot pedal 24 between 0 and 100%. As discussed in detail below, controller 40 may use the scaled right pedal displacement $PR_{scaled}$ and power source speed command map 68 to determine a scaled commanded or requested output speed $S_{Scaled}$ of power source 36. In other situations, such as when the operator's right pedal command is not to be scaled, power source speed command map 68 may be used to determine an unscaled power source output speed $S_{Unscaled}$ based on the actual displacement $PR_{Actual}$ of right foot pedal 24.

Figure 9:
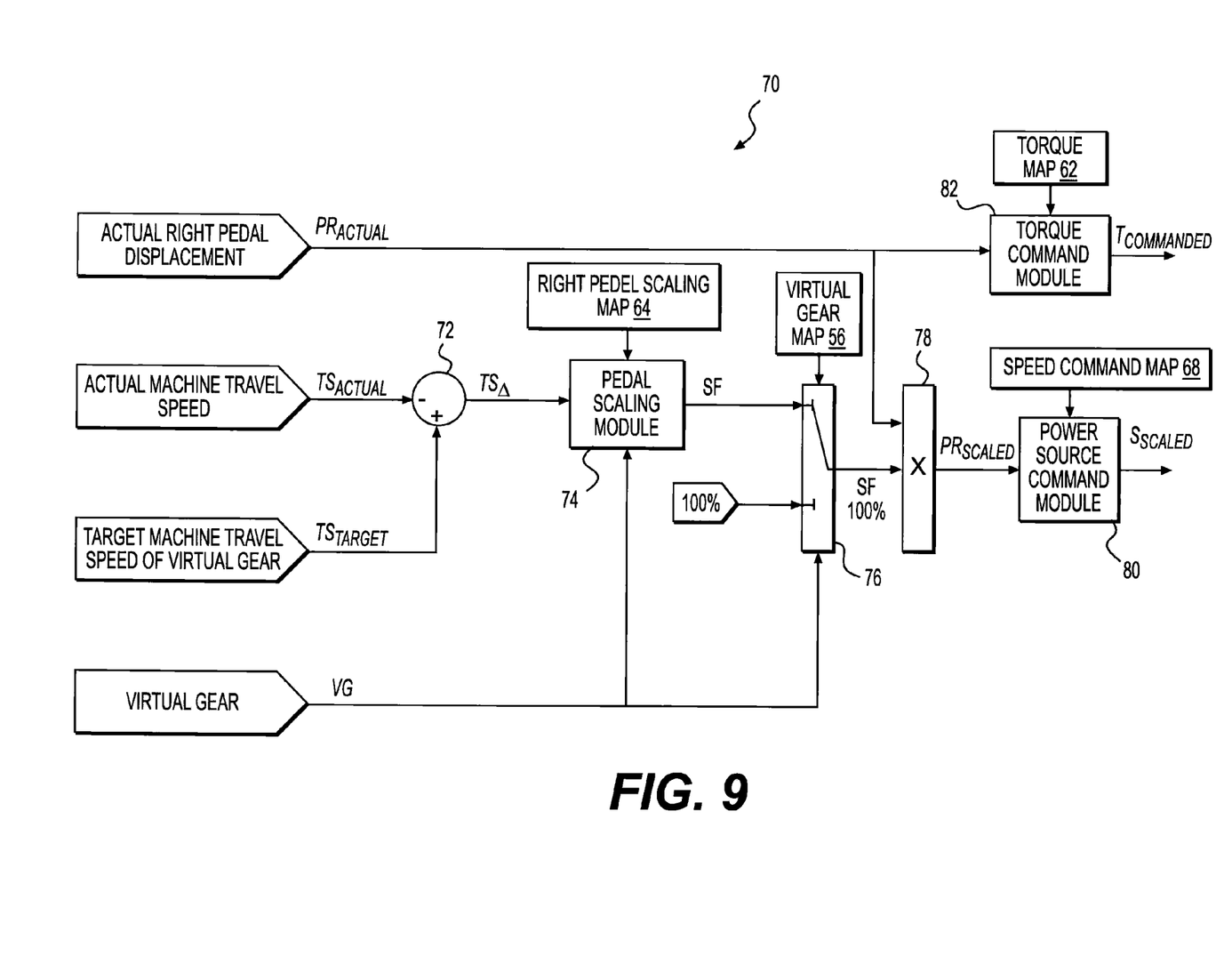
FIG. 9 is a representation of exemplary control strategy of the controller.

FIG. 9 illustrates an exemplary control strategy 70 that may be executed by controller 40 to carry out the disclosed processes. In one embodiment, control strategy 70 may include any combination of software programs or components stored in memory and executed by controller 40. Alternatively or additionally, one or more aspects of control strategy 70 may be implemented using discrete hardware components associated with controller 40.

As shown in FIG. 9, control strategy 70 may include a subtraction module 72. Subtraction module 72 may receive the actual travel speed $TS_{Actual}$ of machine 10, as indicated by the signal from sensor 54. Subtraction module 72 may also receive the target travel speed $TS_{Target}$ of machine 10 for the selected virtual gear. In one embodiment, the target travel speed $TS_{Target}$ for the selected virtual gear may be determined by looking up the selected virtual gear indicated by the signal received from virtual gear selector 28 in virtual gear map 56. Subtraction module 72 may subtract the target travel speed $TS_{Target}$ for the selected virtual gear from the actual machine travel speed $TS_{Actual}$ to determine a travel speed difference $TS_\Delta$—that is, a speed of machine 10 below the run-out of the virtual gear.

Control strategy 70 may further include a pedal scaling module 74. Pedal scaling module 74 may receive an indication of the selected virtual gear VG based on the signal of virtual gear selector 28. Pedal scaling module 74 may also receive the speed difference $TS_\Delta$ determined by subtraction module 72. Pedal scaling module 74 may identify in pedal scaling map 64 a curve 66 associated with the selected virtual gear VG. Then, pedal scaling module 74 may look up on the identified curve 66 a pedal scaling factor SF corresponding to the speed difference $TS_\Delta$ for the selected virtual gear VG.

Control strategy 70 may further include a pedal scaling logic switch 76 configured to select whether to scale the operator's right pedal command. Specifically, pedal scaling logic switch 76 may determine whether to apply the scale factor SF determined by pedal scaling module 74 to the actual pedal displacement $PR_{Actual}$ indicated by the displacement signal received from right foot pedal sensor 52, and thereby reduce the output speed of power source 36. As discussed above, under certain circumstances, such as when machine 10 is operating in a high virtual gear typically used for traveling, it may be desirable to reduce the output speed of power source 36 when the actual travel speed $TS_{Actual}$ of machine 10 approaches the target travel speed $TS_{Target}$ of the virtual gear to operate machine 10 in an economical manner. Thus, in one embodiment, pedal scaling logic switch 76 may receive the signal of virtual gear selector 28 indicating the selected virtual gear VG. Pedal scaling logic switch 76 may then look up the selected virtual gear VG in virtual gear map 56, and retrieve the pedal scaling indicator 61 corresponding to the selected virtual gear 58. If the retrieved pedal scaling indicator 61 indicates that scaling should be applied to the actual pedal displacement $PR_{Actual}$ in the selected virtual gear VG, pedal scaling logic switch 76 may select and output the scale factor SF. However, if the retrieved pedal scaling indicator 61 indicates that no scaling should be applied to the actual pedal displacement command $PR_{Actual}$ in the selected virtual gear VG, pedal scaling logic switch 76 may select and output a value of 100%.

Control strategy 70 may further include a multiplier 78 configured to multiply the scale factor SF by the actual pedal displacement $PR_{Actual}$ to determine a scaled pedal displacement $PR_{scaled}$ using equation (1):

$$PR_{Scaled} = PR_{Actual} \times SF.$$

As an example, if pedal scaling module 74 determines that the scale factor SF under the circumstances is 75%, and pedal scaling logic switch 76 determines that machine 10 is operating in a virtual gear VG in which pedal scaling is to be applied (e.g., virtual gear 4), the scaled pedal displacement $PR_{scaled}$ will equal 75% of the actual pedal displacement $PR_{Actual}$. On the other hand, if pedal scaling logic switch 76 determines that machine 10 is operating in a virtual gear VG in which pedal scaling is not to be applied (e.g., virtual gear 1), and thus outputs a value of 100%, the scaled pedal displacement $PR_{scaled}$ will equal the actual pedal displacement $PR_{Actual}$.

Control strategy 70 may further include a power source command module 80. Power source command module 80 may receive the scaled pedal displacement $PR_{Scaled}$ from multiplier 78 and generate a corresponding output signal commanding a scaled speed $S_{scaled}$ of power source 36. Specifically, in one embodiment, power source command module 80 may look up the scaled pedal displacement $PR_{Scaled}$ in power source speed command map 68 to determine a scaled commanded power source speed $S_{Scaled}$ (e.g., 1,600 RPM) that corresponds to the scaled pedal displacement $PR_{Scaled}$. Power source command module 80 may then generate a power source command signal indicative of the scaled commanded power source speed $S_{Scaled}$, which may be communicated to power source 36. In response, power source 36 may modulate its current output speed to reach or track the scaled power source speed $S_{Scaled}$. Thus, to the extent that the scaled pedal displacement $PR_{Scaled}$ is less than the actual pedal displacement $PR_{Actual}$ (e.g., 75%), the output speed of power source 36 may be reduced.

Continuing with FIG. 9, control strategy 70 may further include a torque command module 82. Torque command module 82 may receive the actual pedal displacement $PR_{Actual}$ as indicated by the signal associated with right foot pedal 24, and may generate a corresponding output signal commanding a torque output $T_{Commanded}$ of CVT 38. Specifically, in one embodiment, torque command module 82 may look up the actual pedal displacement $PR_{Actual}$ in torque map 62 to determine the commanded torque output $T_{Commanded}$ that corresponds to the actual pedal displacement $PR_{Actual}$. Torque command module 82 may then generate a torque output command signal indicative of the commanded torque output $T_{Commanded}$, which may be communicated to CVT 38. In response, CVT 38 may modulate its actual torque output to reach or track the commanded torque output $T_{Commanded}$. Thus, to the extent that the output speed of power source 36 decreases in response to the scaled pedal displacement $PR_{Scaled}$ being less than the actual pedal displacement $PR_{Actual}$, the output speed of CVT 38 (i.e., driven element 46) will increase in order to maintain the commanded torque output $T_{Commanded}$. Accordingly, as the travel speed $TS_{Actual}$ of machine 10 approaches and/or maintains the target travel speed $TS_{Target}$ associated with the selected virtual gear VG, the output speed and/or power of power source 36 may be reduced, allowing machine 10 to operate in an economical manner without sacrificing desired performance.

Figure 10:
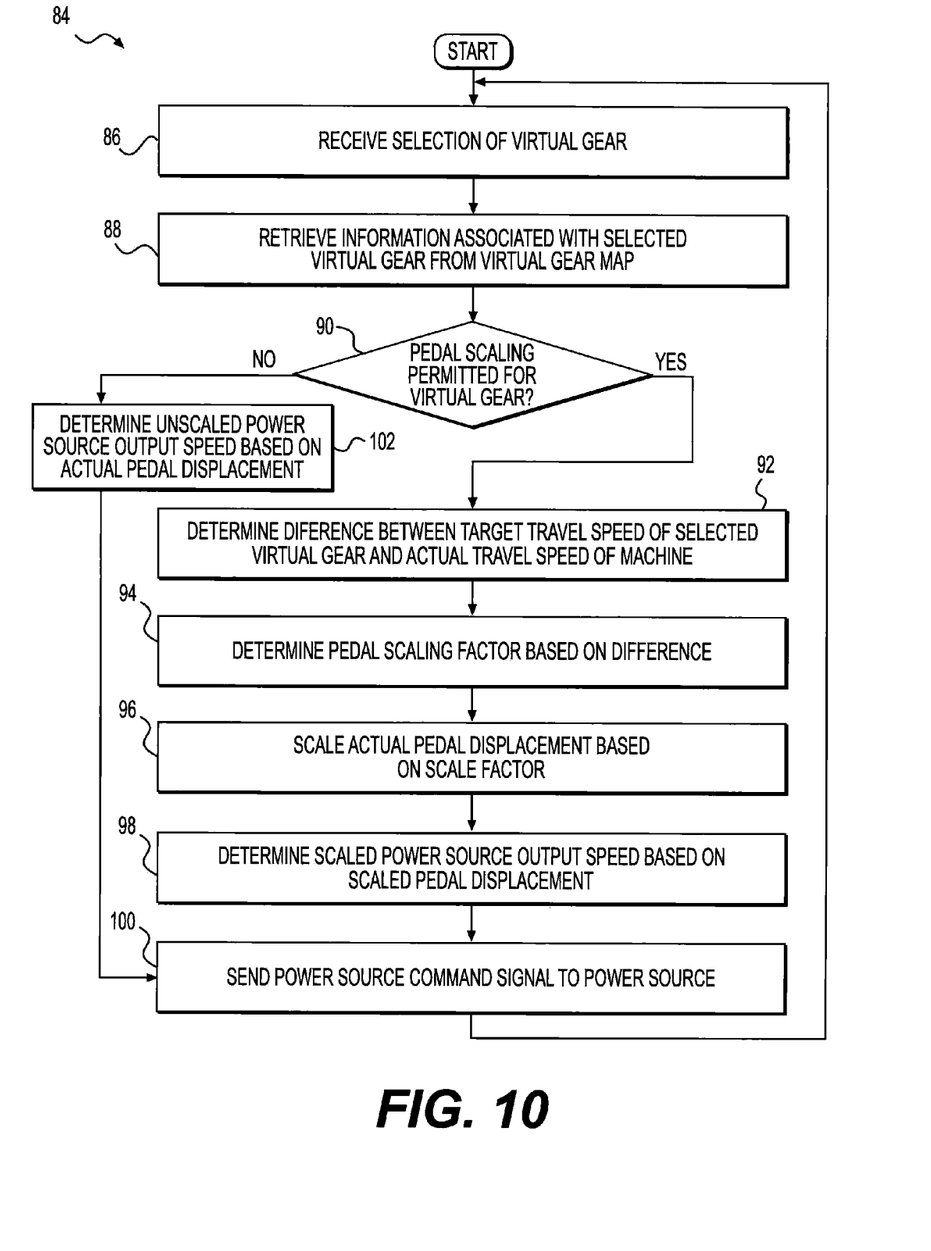
FIG. 10 is a representation of an exemplary power source control method performed by the controller.

FIG. 10 is a flowchart illustrating an exemplary power source control method 84, consistent with the disclosed embodiments. In one embodiment, method 84 may be performed by controller 40 executing control strategy 70.

In step 86, controller 40 may receive a selection of a virtual gear. For example, the operator of machine 10 may provide appropriate input to virtual gear selector 28 to select virtual gear 4.0 or virtual gear 2.5. In some embodiments, controller 40 may update display device 30 to display an indication of the selected virtual gear in readout 34.

In step 88, controller 40 may retrieve information associated with the selected virtual gear from virtual gear map 56. For example, controller 40 may look up the selected virtual gear in virtual gear map 56 and retrieve the corresponding target travel speed 60 and pedal scaling indicator 61 associated with the selected virtual gear.

In step 90, controller 40 may determine whether scaling of the operator's right pedal displacement command is permitted for the selected virtual gear. In other words, as discussed above, controller 40 may determine whether overriding or modification of the actual pedal displacement $PR_{Actual}$ associated with right foot pedal 24 is permitted in certain situations, such as when the actual travel speed $TS_{Actual}$ of machine 10 approaches and/or has reached the target travel speed $TS_{Target}$ associated with the selected virtual gear. Specifically, in one embodiment, controller 40 may determine whether pedal scaling is permitted based on the pedal scaling indicator 61 retrieved in step 88. For example, if the operator selected virtual gear 4 in step 86, controller 40 may determine that pedal scaling is permitted based on the pedal scaling indicator 61 for virtual gear 4 listed in virtual gear map 56. If the operator selected virtual gear 1.5 in step 86, on the other hand, controller 40 may determine that pedal scaling is not permitted based on the pedal scaling indicator 61 for virtual gear 1.5 listed in virtual gear map 56.

If it is determined in step 90 that pedal scaling is permitted for the virtual gear, in step 92, controller 40 may determine a difference $TS_\Delta$ between the target travel speed $TS_{Target}$ for the selected virtual gear and the actual travel speed $TS_{Actual}$ of machine 10. In other words, controller 40 may determine a speed of machine 10 below run-out for the selected virtual gear. Assume, for example, that the has operator selected virtual gear 4.0, and controller 40 determines that virtual gear 4.0 has a target travel speed $TS_{Target}$ of 35 kph, as shown in virtual gear map 56. When the operator fully depresses right foot pedal 24, power source 36 may modulate its output speed to a maximum, and CVT 38 may modulate its output speed to a maximum, causing machine 10 to accelerate to 35 kph. Meanwhile, controller 40 may periodically or continuously calculate a difference $TS_\Delta$ between the target travel speed $TS_{Target}$ of 35 kph and the actual travel speed $TS_{Actual}$ of machine 10. For example, at the time machine 10 reaches an actual travel speed $TS_{Actual}$ of 30 kph, controller 40 may calculate a speed difference $TS_\Delta$ of 5 kph (35 kph−30 kph).

In step 94, controller 40 may determine a pedal scaling factor SF based on the difference $TS_\Delta$ between the target travel speed $TS_{Target}$ for the selected virtual gear and the actual travel speed $TS_{Actual}$ of machine 10, as determined in step 92. Specifically, in one embodiment, controller 40 may identify in pedal scaling map 64 a curve 66 associated with the selected virtual gear VG. Continuing with the example above in which virtual gear 4 is selected, controller 40 may identify a curve 66 associated with virtual gear 4. Then, controller 40 may look up on the curve 66 for virtual gear 4 a pedal scaling factor SF corresponding to the speed difference $TS_A$. For example, assume machine 10 has now reached an actual travel speed $TS_{Actual}$ of 32.5 kph, which corresponds to a speed difference $TS_A$ of 2.5 kph (i.e., 2.5 kph from run-out). By looking up 2.5 kph on the curve 66 for virtual gear 4, controller 40 may determine that the appropriate pedal scaling factor SF is about 90%, meaning that the actual displacement $PR_{Actual}$ associated with right foot pedal 24 will be reduced or scaled by 10%. Assume, on the other hand, machine 10 has only reached a travel speed of 30 kph, or a speed difference $TS_A$ of 5 kph (i.e., 5 kph from run-out). In this case, controller 40 may look up 5 kph on the curve 66 for virtual gear 4 and determine that the appropriate pedal scaling factor SF is 100%, meaning that the actual displacement $PR_{Actual}$ associated with right foot pedal 24 will not be reduced or modified.

In step 96, controller 40 may scale the actual pedal displacement $PR_{Actual}$ based on the scale factor SF determined in step 94 using equation (1):

$$PR_{scaled} = PR_{Actual} \times SF.$$

As described above, the operator has fully depressed right foot pedal 24 to cause machine 10 to accelerate to the target travel speed $TS_{Target}$ of 35 kph for virtual gear 4. Accordingly, the signal from sensor 52 may indicate an actual pedal displacement $PR_{Actual}$ of 100%. Thus, in the case that controller 40 has calculated a scale factor SF of 100%, controller 40 may calculate a scaled pedal displacement $PR_{scaled}$ of 100%, which is equal to the actual displacement $PR_{Actual}$. However, if controller 40 instead calculated a scale factor SF of 90%, controller 40 may calculate a scaled pedal displacement $PR_{Scaled}$ of 90%.

In step 98, controller 40 may determine a scaled power source output speed $S_{scaled}$ based on the scaled pedal displacement $PR_{scaled}$ determined in step 96. Specifically, in one embodiment, controller 40 may look up the scaled pedal displacement $PR_{scaled}$ on power source speed command map 68 to determine the corresponding scaled power source output speed $S_{scaled}$.

In step 100, controller 40 may generate and send a command signal to power source 36 indicative of the scaled power source output speed $S_{scaled}$. In response, power source 36 may modulate its current output speed to reach or track the scaled power source speed $S_{scaled}$. Thus, to the extent that the scaled pedal displacement $PR_{scaled}$ is less than the actual pedal displacement $PR_{Actual}$, the output speed and/or power of power source 36 may be reduced, thus conserving fuel and/or other resources. As an example, if the scaled pedal displacement $PR_{Scaled}$ is 90% of the actual pedal displacement $PR_{Actual}$, the output speed of power source 36 may be reduced by 10%, such as from 1,600 RPM to 1,440 RPM.

Moreover, since the operator is still fully depressing right foot pedal 24, and the actual pedal displacement $PR_{Actual}$ remains at 100%, controller 40 may still command a maximum torque output $T_{commanded}$ of CVT 38. As a result of the reduction in the output speed of power source 36, CVT 38 may accordingly increase its output speed to maintain the commanded output torque $T_{Commanded}$. For example, in response to a 10% reduction in the output speed of power source 36, CVT 38 may increase its torque-to-speed ratio by 10%. Thus, machine 10 may nonetheless reach and/or maintain the target travel speed $TS_{Target}$ associated with the selected virtual gear (e.g., 35 kph).

Returning to step 90, if it is determined that pedal scaling is not permitted for the selected virtual gear, controller 40 may determine an unscaled power source output speed $S_{Unscaled}$ based on the actual pedal displacement $PR_{Actual}$, in step 102. For example, if virtual gear 1.5 is selected, and controller 40 determines that pedal scaling is not permitted (see virtual gear map 56), controller 40 may look up the actual pedal displacement $PR_{Actual}$ (i.e., 100%) in power source speed command map 68 to identify a corresponding unscaled power source output speed $S_{Unscaled}$. Then, controller 40 may generate and send a command signal to power source 36 indicative of unscaled power source output speed $S_{Unscaled}$, as discussed above in connection with step 100. In response, power source 36 may modulate its current output speed to reach or track the unscaled power source output speed $S_{Unscaled}$.

Industrial Applicability

The disclosed systems and methods may be applicable to any vehicle or other mobile machine having a CVT. In particular, the disclosed systems and methods may be applicable to a mobile machine having a CVT system providing one or more operator-selectable virtual gears with respective maximum or target travel speeds of the machine.

By scaling or reducing the operator's right foot pedal command to the engine or other power source of the machine as the machine approaches run-out in one or more of the virtual gears, the output speed may be reduced, conserving fuel or other onboard resources. Moreover, since an appropriate torque command or request is still provided to the CVT, the machine may still accelerate to and/or maintain the desired maximum or target travel speed of the virtual gear. Accordingly, the disclosed embodiments provide for operating a machine with a CVT system in an economical fashion.

It will be apparent to those of ordinary skill in the art that various modifications and variations can be made to the disclosed embodiments without departing from the spirit or scope of the disclosure. For example, the disclosed system and methods may be practiced utilizing different types of machines, power sources, CVTs, and/or virtual gears associated with different target travel speeds.

In addition, different methods may be used to override and/or scale the operator's right pedal command to reduce the output speed of the power source. For example, in an another embodiment, the operator's right pedal command may be overrode or scaled, and the output speed of the power source thus reduced, after the power source, the CVT, and/or other system of the mobile machine has operated in a steady-state condition for a period of time. For instance, after the CVT has operated at a certain torque-to-speed ratio for a period of time, the operator's right pedal command may be overrode or scaled, and the output speed of the power source may be reduced. Alternatively or additionally, after the power source has operated at a certain output speed (e.g., above a threshold speed) for a period of time, the operator's right foot pedal command may be overrode or scaled, and the output speed of the power source may be reduced. In another configuration, after the operator has maintained the right foot pedal at a certain position (e.g., displaced beyond a threshold) for a period of time, the operator's right pedal command may be overrode or scaled, and the output speed of the power source may be reduced. In another embodiment, the operator's right foot pedal command may be overrode or scaled, and the output speed of the power source may be reduced, if the mobile machine is using less power than a current or available power output of the power source.

Other embodiments will be apparent to those skilled in the art from consideration of the specification and practice of the disclosed embodiments. It is intended that the specification and examples be considered as exemplary only, with a true scope being indicated by the following claims and their equivalents.

What is claimed is:

1. A method for controlling a power source of a mobile machine having a continuously variable transmission (CVT), the method comprising:
   receiving, from an operator of the mobile machine, input selecting of one of a plurality of target travel speeds of the mobile machine;
   receiving, from the operator, input indicative of a requested output speed of the power source;
   calculating a difference between the selected target travel speed and an actual travel speed of the mobile machine;
   adjusting the requested output speed of the power source based on the calculated travel speed difference;
   determining a scaling factor for the selected target travel speed that corresponds to the calculated travel speed difference; and
   commanding the power source based on the adjusted requested output speed of the power source.

2. The method of claim 1, wherein adjusting the requested output speed of the power source includes decreasing the requested output speed of the power source.

3. The method of claim 1, wherein adjusting the requested output speed of the power source includes:
   adjusting the requested output speed of the power source based on the scaling factor.

4. The method of claim 3, wherein determining a scaling factor includes:
   accessing a scaling map for the target travel speeds, the scaling map mapping differences between the target travel speeds and the actual travel speed of the mobile machine to respective scaling factors; and
   looking up the scaling factor on the scaling map based on the calculated travel speed difference.

5. The method of claim 3, wherein determining a scaling factor includes determining a scaling factor such that the adjusted requested output speed of the power source decreases relative to the requested output speed of the power source as the calculated travel speed difference decreases.

6. The method of claim 1, further comprising:
   determining whether adjustment of the requested output speed of the power source is permitted for the selected target travel speed; and
   adjusting the requested output speed of the power source only when it is determined that adjustment is permitted for the selected target travel speed.

7. The method of claim 6, wherein:
   the target travel speeds include respective scaling indicators indicating whether adjustment of the requested output speed of the power source is permitted for the target travel speeds; and
   determining whether adjustment is permitted includes identifying the scaling indicator for the selected target travel speed.

8. The method of claim 7, wherein:
   the plurality of target travel speeds include a range of target travel speeds; and
   determining whether adjustment is permitted includes determining whether the selected target travel speed is above or below a point in the range.

9. A control system for controlling a power source of a mobile machine having a continuously variable transmission (CVT), the system comprising:
   a memory storing a plurality of target travel speeds of the mobile machine;
   a first operator input device configured to receive from an operator of the mobile machine input selecting one of the plurality target travel speeds;
   a second operator input device configured to receive from the operator input indicative of a requested output speed of the power source;
   a sensor configured to sense an actual travel speed of the mobile machine; and
   a controller configured to:
      calculate a difference between the selected target travel speed of the mobile machine and the actual travel speed of the mobile machine;
      determine a scaling factor for the selected target travel speed that corresponds to the calculated travel speed difference;
      adjust the requested output speed of the power source based on the calculated travel speed difference; and
      command the power source based on the adjusted requested output speed.

10. The system of claim 9, wherein the controller is configured to adjust the requested output speed of the power source by decreasing the requested output speed of the power source.

11. The system of claim 9, wherein, to adjust the commanded output speed of the power source, the controller is further configured to:
   adjust the requested output speed of the power source based on the scaling factor.

12. The system of claim 11, wherein:
   the memory further stores a scaling map for the plurality of target travel speeds, the scaling map mapping differences between the target travel speeds and the actual travel speed of the mobile machine to corresponding scale factors; and
   the controller is configured to determine the scaling factor by looking up the scaling factor on the scaling map based on the calculated travel speed difference.

13. The system of claim 12, wherein the scaling map maps scaling factors such that the adjusted requested output speed of the power source decreases relative to the requested output speed of the power source as the calculated travel speed difference decreases.

14. The system of claim 9, wherein the controller is further configured to:
   determine whether adjustment of the requested output speed of the power source is permitted for the selected target travel speed; and
   adjust the requested output speed of the power source only when it is determined adjustment is permitted for the selected target travel speed.

15. The system of claim 14, wherein:
   the target travel speeds include respective scaling indicators indicating whether adjustment of the requested output speed of the power source is permitted for the target travel speeds; and
   the controller is configured to determine whether adjustment of the requested output speed of the power source is permitted based on the scaling indicator for the selected target travel speed.

16. The system of claim 14, wherein:
   the target travel speeds include a range of target travel speeds; and
   the controller is configured to determine whether adjustment is permitted based on whether the selected target travel speed is above or below a point in the range.

17. A mobile machine, comprising:
   at least one traction device configured to propel the mobile machine;
   a power source configured to generate a power output;

a continuously variable transmission (CVT) configured to drive the at least one traction device with the power output;

a memory storing a plurality of target travel speeds of the mobile machine;

a first operator input device configured to receive from an operator of the mobile machine input selecting one of the plurality target travel speeds;

a second operator input device configured to receive from the operator input indicative of a requested output speed of the power source;

a sensor configured to sense an actual travel speed of the mobile machine; and a controller configured to:

calculate a difference between the selected target travel speed of the mobile machine and the actual travel speed of the mobile machine;

determine a scaling factor for the selected target travel speed that corresponds to the calculated travel speed difference;

adjust the requested output speed of the power source based on the calculated travel speed difference; and command the power source based on the adjusted requested output speed.

18. The mobile machine of claim 17, wherein the controller is configured to adjust the requested output speed of the power source by decreasing the requested output speed of the power source.

19. The mobile machine of claim 17, wherein, to adjust the requested output speed of the power source, the controller is further configured to:

adjust the requested output speed of the power source based on the scaling factor.

20. The mobile machine of claim 19, wherein:

the memory further stores a scaling map for the plurality of target travel speeds, the scaling map mapping differences between the target travel speeds and the actual travel speed of the mobile machine to corresponding scale factors; and the controller is configured to determine the scaling factor by looking up the scaling factor on the scaling map based on the calculated travel speed difference.

21. The mobile machine of claim 20, wherein the scaling map maps scaling factors such that the adjusted requested output speed of the power source decreases relative to the requested output speed of the power source as the calculated travel speed difference decreases.

22. The mobile machine of claim 17, wherein the controller is further configured to:

determine whether adjustment of the requested output speed of the power source is permitted for the selected target travel speed; and adjust the requested output speed of the power source only when it is determined adjustment is permitted for the selected target travel speed.

23. The mobile machine of claim 22, wherein:

the target travel speeds include respective scaling indicators indicating whether adjustment of the requested output speed of the power source is permitted for the target travel speeds; and the controller is configured to determine whether adjustment of the requested output speed of the power source is permitted based on the scaling indicator for the selected target travel speed.

24. The mobile machine of claim 22, wherein:

the target travel speeds include a range of target travel speeds; and the controller is configured to determine whether adjustment is permitted based on whether the selected target travel speed is above or below a point in the range.

* * * * *